J. A. McPHERSON.

Torch.

No. 9,591. Reissued March 1, 1881.

ATTEST:

John J. Rafferty,
James H. Slade.

INVENTOR:

James A. McPherson.

N. PETERS, PHOTO-LITHOGRAPHER, WASHINGTON, D. C.

UNITED STATES PATENT OFFICE.

JAMES A. McPHERSON, OF BRUNSWICK, NEW YORK.

TORCH.

SPECIFICATION forming part of Reissued Letters Patent No. 9,591, dated March 1, 1881.

Original No. 187,232, dated February 13, 1877. Application for reissue filed July 31, 1880.

*To all whom it may concern:*

Be it known that I, JAMES A. McPHERSON, of Brunswick, in the county of Rensselaer and State of New York, have invented a new and useful Improvement in Torches; and I do hereby declare that the following is a full, clear, and exact description of the same, reference being had to the accompanying drawings, which form a part of this specification.

Figure 1:
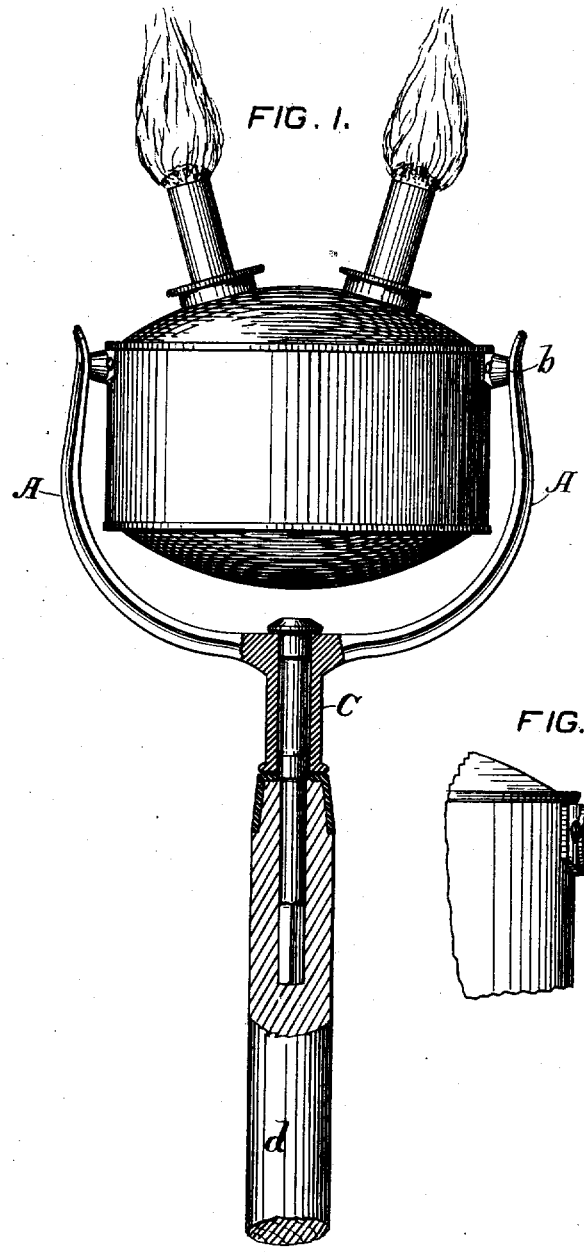
Figure 2:
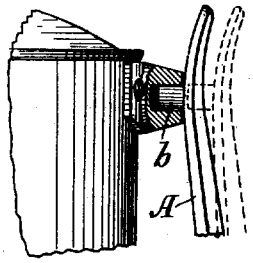

Figure 1 is an elevation of the torch, showing sleeve C and a portion of the handle in section; and Fig. 2 a sectional elevation of a portion thereof, showing the eye secured to the oil-cup and the pivot upon the elastic arm, the position of said arm, when retracted, being indicated by dotted lines.

This invention consists, first, in pivots on the inner sides of the arms of a torch-frame, so placed that they may be sprung into or out of eyes on the sides of the torch-cup; second, in the combination, in a torch-frame, of the arms with pivots upon the inner sides, so that they may be sprung from or into the eyes of the cup, and a sleeve or socket at the junction of the arms, through which, by a pin, the frame is secured to the handle, all as hereinafter more fully described.

The torch-cup is made in the usual manner.

The frame, consisting of two arms, A A, two pivots, *b b*, and the sleeve *c* at the junction of the two arms, is made of metal. I prefer malleable iron, because these several parts can be readily cast as one piece, and it is sufficiently flexible to allow the pivots on the arms to be sprung out from the eyes of the cup. The arms A A of the frame terminate in a sleeve, *c*. Through this sleeve is a pin, which secures it to the handle *d* and allows the frame and cup to revolve, so that whenever the torch is taken up by its handle the cup must immediately assume a perpendicular position. This sleeve is made of sufficient length to give the necessary bearing for proper support of frame and cup. On the inner side of the outer ends of each of these arms is a pivot, *b b*, which fits and works in a corresponding eye secured on side of cup. These pivots can be readily sprung from the eyes and returned to the same or another cup at pleasure, in case of injury to the cup or frame, which is quite an important feature in torches.

By this mode of construction a cheap, substantial, simple, and excellent torch is produced.

I make no claim to a torch suspended within a frame to swing or revolve upon pivots.

What I claim as my invention, and desire to secure by Letters Patent, is—

1. The pivots on the inner sides of the arms of a torch-frame, placed, as described, so that they may be sprung into or out of eyes on the sides of the torch-cup.

2. The combination, in a torch-frame, of the arms with pivots upon the inner sides that may be sprung from or into the eyes of the cup, and a sleeve or socket at the junction of the arms, through which, by a pin, the frame is secured to the handle, substantially as described.

In witness whereof I have hereunto set my hand this 14th day of July, 1880.

JAMES A. McPHERSON.

Witnesses:

GEO. P. LAWTON,

JOHN J. RAFFERTY.